Aug. 8, 1939.   H. SMITH ET AL   2,168,588
COLLAPSIBLE SEGMENTAL FORMER
Filed Feb. 26, 1938   2 Sheets-Sheet 1
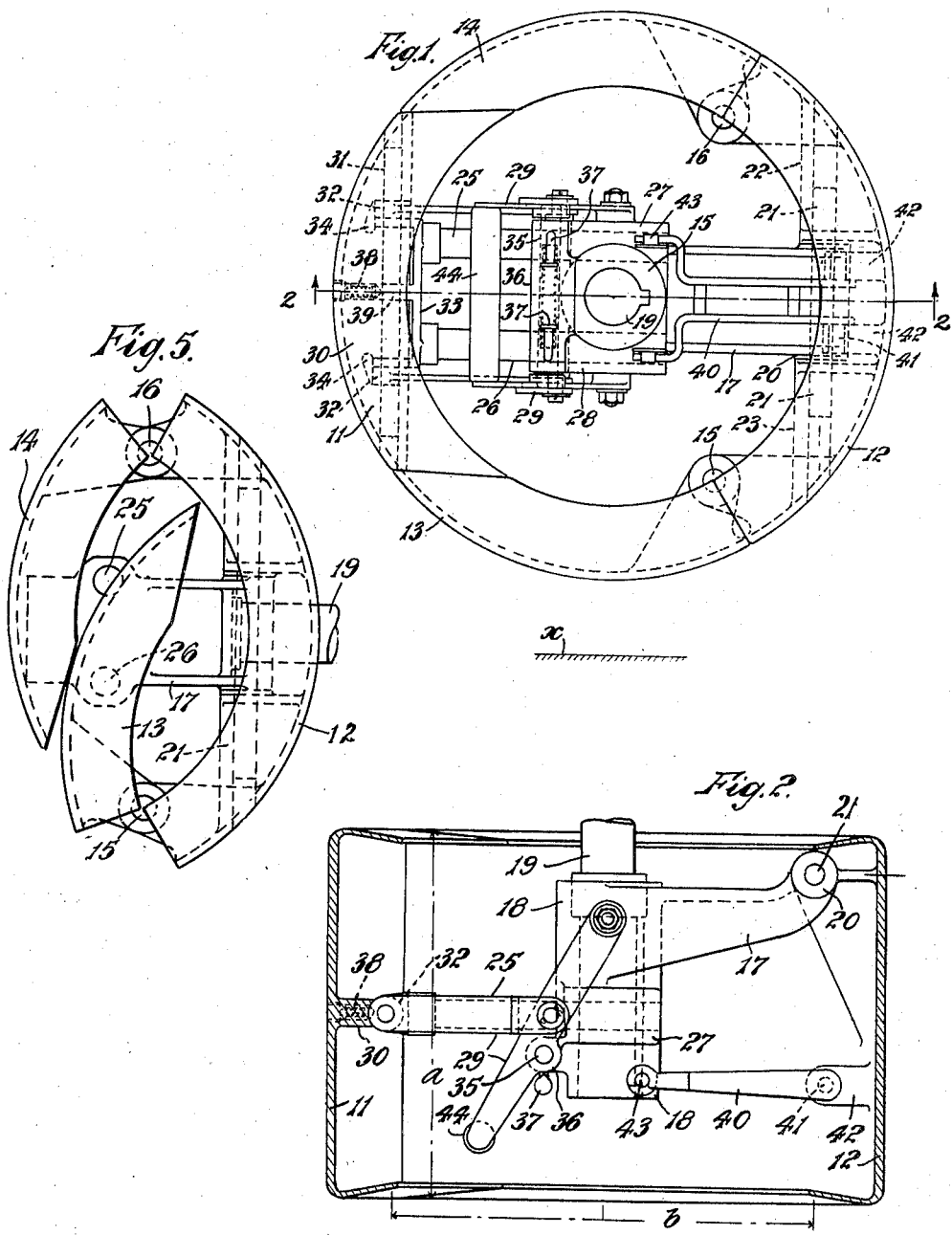
Inventors
Harold Smith
Harry Taylor
by Benj. T. Pauber, their Attorney Aug. 8, 1939.   H. SMITH ET AL   2,168,588
COLLAPSIBLE SEGMENTAL FORMER
Filed Feb. 26, 1938   2 Sheets-Sheet 2
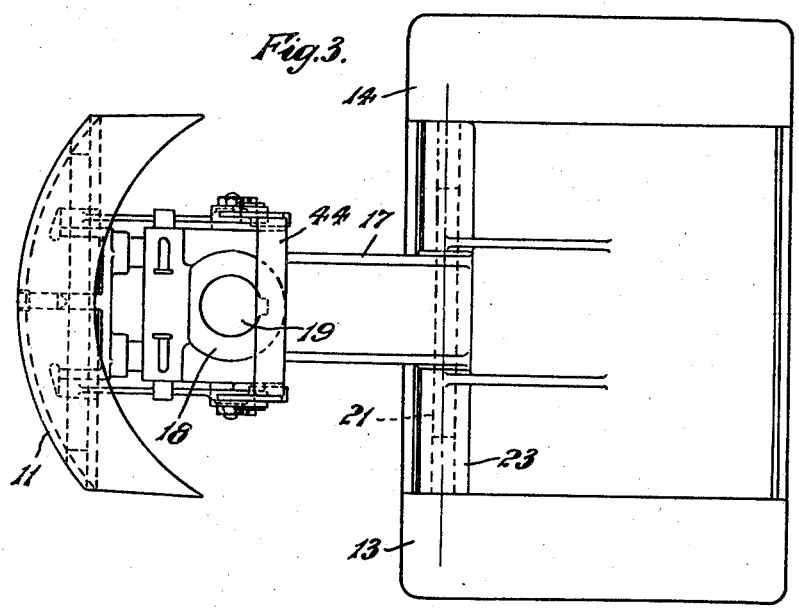
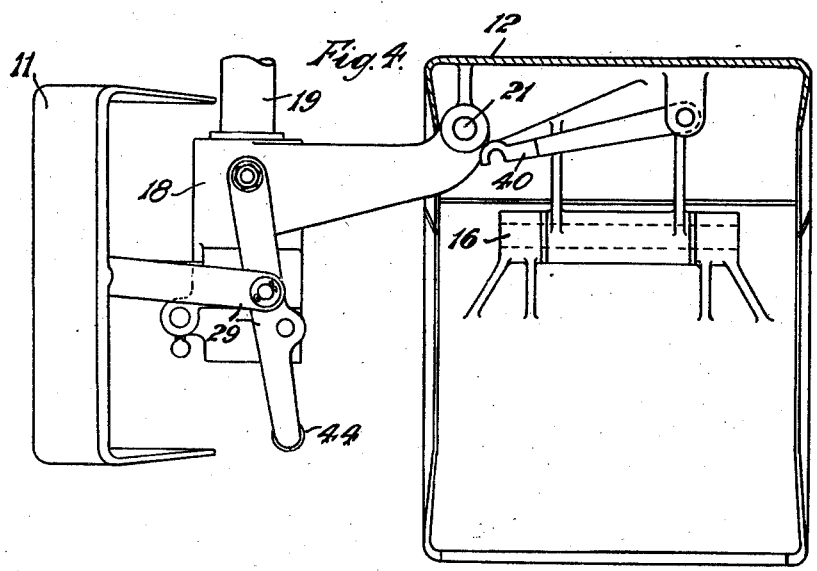

Patented Aug. 8, 1939

2,168,588

UNITED STATES PATENT OFFICE 2,168,588

COLLAPSIBLE SEGMENTAL FORMER

Harold Smith, Sutton Coldfield, and Harry Taylor, Erdington, Birmingham, England, assignors to Dunlop Rubber Company, Limited, London, England, a British company Application February 26, 1938, Serial No. 192,746
In Great Britain January 29, 1937

7 Claims. (Cl. 154—9)

This invention relates to collapsible segmental formers of the type used in forming tires. More particularly the invention relates to a former having two separable parts, one of which forms a key segment which holds the former from collapsing, and the other of which has parts that may be collapsed inwardly when the key part is removed or swung out of position and in which after the key part has been displaced to break the circumferential continuity of the former, and when the main or collapsible part is swung out of the rotational plane of the former the segment of the main part may be collapsed for the removal of the tire or similar article.

Hitherto formers of the above general type have been restricted to those in which the tire is built up on a cross-section approximating that of the finished tire directly on the former so that a subsequent shaping or expanding operation is not necessary.

In our present invention we provide a former having separable key and collapsing sections of the "flat" type, that is, one having an approximately cylindrical shape to form a flat band which must be subsequently expanded and shaped for molding into a tire.

More particularly, the invention provides a former of the above type in which the width is of much the same order of magnitude of bead diameter as, for example, one in which the width may be equal to 75% or more of the bead diameter.

In formers for forming cylindrical or flat tires, particularly tires of considerable width, according to our invention, the collapsible section of the former rim is mounted to swing sidewise relative to the key section on a pivot pin offset from the median plane of the rim and preferably as near as possible to one side of the rim so that in swinging it will draw away from or clear the rim of the key section.

The key section is so mounted preferably by means of a pivotal mounting parallel to the swinging axis as to be capable of local rocking movement. Preferably the pivot pin on which the collapsible portion is mounted is vertical, the axis of rotation of the former rim being horizontal.

Suitable means are also provided for locking the swinging section into position and also for holding the key section from rocking when the former is assembled.

Various features of the invention are illustrated by way of example in the accompanying drawings, in which Fig. 1 is a side view of a former embodying a preferred form of the invention. Fig. 2 is a section taken on line 2—2 of Fig. 1 horizontally on the axis of rotation of a former. Fig. 3 is a view similar to that of Fig. 1 but showing the sections swung sidewise relative to each other. Fig. 4 is a view on the same plane as that of Fig. 2 showing the sections swung apart, and Fig. 5 is a side view of the collapsible former in collapsed position.

In the preferred embodiment of the invention shown in the accompanying drawings, the key part comprises a segment 11 while the main part comprises a middle segment 12 and two side segments 13 and 14 hinged at 15 and 16 one on each end of the said middle segment.

From the drawings it will be appreciated that the width of the former $a$ is a considerable proportion of its bead diameter $b$, that is the diameter of the bead of the tire in connection with which the former is used, the instance illustrated providing a good example of the swing difficulty referred to above.

Carried by the middle segment 12 is a bracket 17 incorporating at its inner end a bearing boss 18 which fits on a central shaft 19, which latter comprises the axle on which the drum rotates.

Through a boss 20 on the outer end of bracket 17 passes a spindle 21 which fits into a pair of opposed bosses 22 and 23 on the middle segment 12. This provides connection between the bracket 17 and said middle segment 12 and also provides the hinge or pivot about which the unit comprising the main part of the former swings.

The line $x$ indicates diagrammatically the relationship of the floor to the former when the latter is in position for collapse and from the drawings it will be appreciated that the swing of the main part proceeds horizontally, from the position shown in Fig. 1 to that shown in Fig. 3, about a vertical pivot, namely 21, instead of vertically about a horizontal pivot as has been the practice hitherto.

Thus the former can be disposed at a height from the floor which makes it nicely accessible to the operator and provides ample space for accommodating the tire building mechanisms with which the former may be associated, with the side formers with which we are dealing, if collapse took place as hitherto the former would have to be disposed at an inconvenient height from the floor to accommodate such collapse and/or the tire building mechanisms referred to.

From the drawings also it will be appreciated that the said pivot 21 is spaced away from the median plane 24 of the former as much as possible, as shown in Fig. 2 said pivot is preferably placed as near to the edge of the former as is conveniently possible.

In this way we provide that the main part is capable of the necessary swing without fouling the axle, if the pivot 21 were disposed on the median plane 24 of the former, the edge of said former would foul the axle and thus the requisite swing would be precluded.

Carried by the key segment 11 are two slides 25 and 26 which run in guides 27 and 28 on the bracket 17 aforesaid. Said slides are slid in said guides by a lever and link system 29 to displace the key segment.

In the key segment 11 is a boss 30 which houses a spindle 31. The linkage 29 connects with this spindle directly at 32 and the slides 25 and 26 connect with said spindle via a yoke 33, the boss 30 being appropriately recessed at 34.

In this way spindle 31 provides connection between the key segment and the parts supporting the same upon the axle and also provides the pivot about which said key segment rocks locally.

Suitable detent or the like provision may be made, for example, locking means associated with the linkage 29 may be provided to retain the key segment 11 in expanded position, location means associated with the key segment may be provided to prevent said segment rocking at unwanted times, and stay means acting between the middle segment 12 and the boss 18 may be provided, temporarily to support the main part as a unit when the key segment is withdrawn.

As illustrated these three provisions are conveniently as follows:—

Said locking means comprises a pair of spring-loaded plungers 35 in an extension 36 of the boss 18, said plungers engaging suitable holes in the links of the system 29 and being disengageable by finger pieces 37.

Said location means comprises a spring-loaded plunger 38 sliding in a hole in the key segment 11 and coacting with an extension 39 of the yoke 33

And said stay means comprises a lever 40 pivoted at 41 between bosses 42 on the segment 12 and being swingable into engagement with pegs 43 in the boss 18.

Operation of collapse is as follows:—

Firstly the link mechanism 29 is freed by pressing together the finger pieces 37 to release the plungers 35, then handle 44 operating said linkage is pulled outward and the slides 25, 26 are thereby slid through the guides 27, 28 to displace the key segment 11 toward the axle 19.

The stay lever 40 is then disengaged and the main part—that is the unit comprising the middle segment 12 and the two end segments 13 and 14—is swung bodily about its pivot 21 through 90 degrees. As shown in Figs. 3, 4 and 5 in this way said main part is passed into a different plane from that in which the former rotates, so that the whole of the space enclosed by said main part becomes available for the collapse of the end segments thereof, said swing proceeding horizontally and without fouling the axle, as hereinbefore described.

During the early stages of the swing the key segment is rocked by hand about its pivot 31 to accommodate the arc of travel of the beads of the tire casing, the plunger 38 readily leaving its notch in the extension 39 when the requisite pressure is applied to the said key segment to rock it.

Finally, the end segments 13 and 14 of the main part are hinged inwardly on the middle segment 12, folding one over the other thereover, collapse being then complete, as indicated in Fig. 5 of the drawings.

It should be understood that we do not confine ourselves to the above details, as for example instead of operating the key segment by a lever system, the same may be operated by gearing, and the local rocking of said segment may be correlated with the displacement thereof.

Various modifications may be made by those skilled in the art without departing from the invention as defined in the following claims.

What we claim is:

1. Tire forming apparatus which comprises a rotatable hub, an arm extending from said hub and at an angle to the axis thereof, a forming rim section pivoted at one side of its median plane on said arm on an axis transverse to that of said hub to swing to a position concentric with said hub and to a position aside from said hub, rim sections mounted on said pivoted rim section to swing in the plane thereof, a key section to complete said rim, and a support mounted on said hub on which said key section is slidable radially inwardly from closing position.

2. Tire forming apparatus which comprises a rotatable hub, an arm extending from said hub and at an angle to the axis thereof, a forming rim section pivoted at one side of its median plane on said arm on an axis transverse to that of said hub to swing to a position concentric with said hub and to a position aside from said hub, rim sections mounted on said pivoted rim section to swing in the plane thereof, a key section to complete said rim, a support mounted on said hub on which said key section is slidable radially inwardly from closing position, a lever pivoted on said hub, and a link connecting said lever to said key section.

3. Tire forming apparatus which comprises a rotatable hub, an arm extending from said hub and at an angle to the axis thereof, a forming rim section pivoted at one side of its median plane on said arm on an axis transverse to that of said hub to swing to a position concentric with said hub and to a position aside from said hub, rim sections mounted on said pivoted rim section to swing in the plane thereof, a key section to complete said rim, a support mounted on said hub on which said key section is slidable radially inwardly from closing position, and a pivotal connection between said key section and the support therefor to permit said key section to swing on an axis parallel to the pivotal axis of said pivoted section.

4. Tire forming apparatus which comprises a rotatable hub, an arm extending from said hub near one end thereof, a group of collapsible tire forming sections of substantially cylindrical curvature hinged to collapse from cylindrical formation and pivoted on said arm near a side edge of said sections on an axis transverse to that of said hub to swing to a position over said hub, and to a position aside from said hub, a slidable support on said hub, a key section on said slidable support and slidable outwardly from said hub to engage said sections and complete a tire former and to slide inwardly therefrom, and means to lock said key section in its outward position and to lock said group of hinged sections in position concentric with said hub.

5. A tire former having former segments hinged to collapse toward their center, a key segment to form with said hinged segments a complete former of substantially cylindrical curvature, a common support for said hinged and key segments, means to support and move said key segment inwardly toward its center on said support and a pivot means for swinging said hinged segments sidewise of said key segment to clear the latter, said pivot means being mounted on said support within the periphery of said former when completed and offset from the median line of the former sufficiently to permit the hinged segments to swing clear of the key segment when the latter is moved inwardly.

6. The former of claim 5 in which said key segment is pivotally mounted on its supporting and moving means to enable it to rock in the direction of the swinging of said hinged segments to clear the latter.

7. The tire former of claim 5 in which said hinged segments swing on a vertical pivotal axis.

HAROLD SMITH.
HARRY TAYLOR.